(12) United States Patent
Ganster et al.

(10) Patent No.: US 12,137,267 B2
(45) Date of Patent: Nov. 5, 2024

(54) CAMERA CLOUD RECORDING

(71) Applicant: Comcast Cable Communications, LLC, Philadelphia, PA (US)

(72) Inventors: Christopher Ganster, Villanova, PA (US); Craig Skinfill, Lansdale, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 17/249,506

(22) Filed: Mar. 3, 2021

(65) Prior Publication Data

US 2021/0266625 A1 Aug. 26, 2021

Related U.S. Application Data

(63) Continuation of application No. 15/090,096, filed on Apr. 4, 2016, now Pat. No. 10,972,780.

(51) Int. Cl.
*H04N 21/2743* (2011.01)
*G08B 13/196* (2006.01)
*H04N 5/765* (2006.01)
*H04N 5/77* (2006.01)
*H04N 7/18* (2006.01)
*H04N 21/845* (2011.01)

(52) U.S. Cl.
CPC ... *H04N 21/2743* (2013.01); *G08B 13/19656* (2013.01); *G08B 13/19669* (2013.01); *G08B 13/19671* (2013.01); *H04N 5/765* (2013.01); *H04N 5/77* (2013.01); *H04N 7/181* (2013.01); *H04N 21/8456* (2013.01)

(58) Field of Classification Search
CPC ........................................................ H04N 7/18
See application file for complete search history.

(56) References Cited

U.S. PATENT DOCUMENTS

| | | | |
|---|---|---|---|
| 6,459,811 B1 * | 10/2002 | Hurst, Jr. | ......... H04N 21/44004 375/272 |
| 7,155,735 B1 | 12/2006 | Ngo et al. | |
| 7,760,230 B2 | 7/2010 | Russell et al. | |
| 8,237,856 B2 | 8/2012 | Boland et al. | |
| 8,385,663 B2 | 2/2013 | Xu et al. | |
| 2003/0037158 A1 * | 2/2003 | Yano | ...................... H04L 65/752 709/233 |
| 2004/0212677 A1 * | 10/2004 | Uebbing | ................ H04N 7/181 348/E7.086 |
| 2008/0002771 A1 | 1/2008 | Chen | |
| 2008/0309759 A1 | 12/2008 | Wilson et al. | |
| 2009/0189981 A1 | 7/2009 | Siann et al. | |

(Continued)

FOREIGN PATENT DOCUMENTS

WO 2016/210305 A1 12/2016

*Primary Examiner* — Kyle M Lotfi
(74) *Attorney, Agent, or Firm* — BakerHostetler

(57) ABSTRACT

Systems and methods for dynamic communication and control of devices associated with a premises are disclosed. The systems and methods may include a device such as a camera that may be configured via configuration service to capture video of a premises and to transmit segments of the captured video having a pre-determined length of time to a video service. The transmission of the video segments may be periodic and may have a frequency of transmission based on parameters provided by the configuration service.

19 Claims, 7 Drawing Sheets

(56) References Cited

U.S. PATENT DOCUMENTS

| | | |
|---|---|---|
| 2011/0179184 A1 | 7/2011 | Breau et al. |
| 2011/0202844 A1 | 8/2011 | Davidson et al. |
| 2012/0054818 A1 | 3/2012 | Noh et al. |
| 2012/0307049 A1 | 12/2012 | Mimar |
| 2015/0098686 A1 | 4/2015 | Obukhov et al. |
| 2015/0215583 A1 | 7/2015 | Chang |
| 2015/0350611 A1* | 12/2015 | Pearson ............... H04N 7/185 348/158 |
| 2016/0037131 A1 | 2/2016 | Burnett et al. |
| 2016/0088326 A1* | 3/2016 | Solomon ............ H04N 21/254 725/12 |
| 2016/0366389 A1* | 12/2016 | Laganiere ............ H04N 7/181 |
| 2017/0034483 A1* | 2/2017 | Aghdasi ............... G06F 16/78 |
| 2017/0373776 A1* | 12/2017 | Lee ...................... H04H 20/72 |

\* cited by examiner

CAMERA CLOUD RECORDING

CROSS REFERENCE TO RELATED APPLICATIONS

This application is a continuation of U.S. patent application Ser. No. 15/090,096, filed Apr. 4, 2016, which is hereby incorporated by reference in its entirety.

BACKGROUND

Existing solutions for continuous video recording relating to a premises, such as security video, often consumes significant network (e.g., Wi-Fi) air time and bandwidth due to the continuous transmission of video over the premises network. As an example, such utilization of network resources for continuous transmission of video may cause interruptions in other services using the network, such as video-on-demand (VOD) playback through an online service provider. Additionally, many video recording systems require modification to the captured video format for subsequent playback using a video player on mobile devices and/or set-top boxes. The modification to the video format adds latency to playback, which negatively affects the user experience.

SUMMARY

The present disclosure provides systems and methods for dynamic communication and control of premises devices such as video capture devices (e.g., cameras), sensors, and the like. As an example, a configuration service may be configured to communicate with one or more premises devices at boot up and/or on a defined interval to enable/disable video recording, define location to post data such as video data, authenticate information such as users or devices on the network, determine video format/settings, and configure the length of a video segment/clip.

A device configured to capture video of a premises (e.g., premises device) may be configured via the configuration service to transmit segmented video clips (e.g., video segments) having a pre-determined duration (e.g., between about 10 seconds and about 20 seconds) to a video service. The video service may process the video clips and distribute the video clips to the appropriate video store. The video service may also facilitate the storage of the video clips in multiple locations for geo-redundancy, for example. Once the video clips are stored, one or more playback devices, such as video client applications, may access or receive the video clips using a manifest providing storage and identification information for the video clips.

Additional advantages will be set forth in part in the description which follows or may be learned by practice. It is to be understood that both the foregoing general description and the following detailed description are exemplary and explanatory only and are not restrictive.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
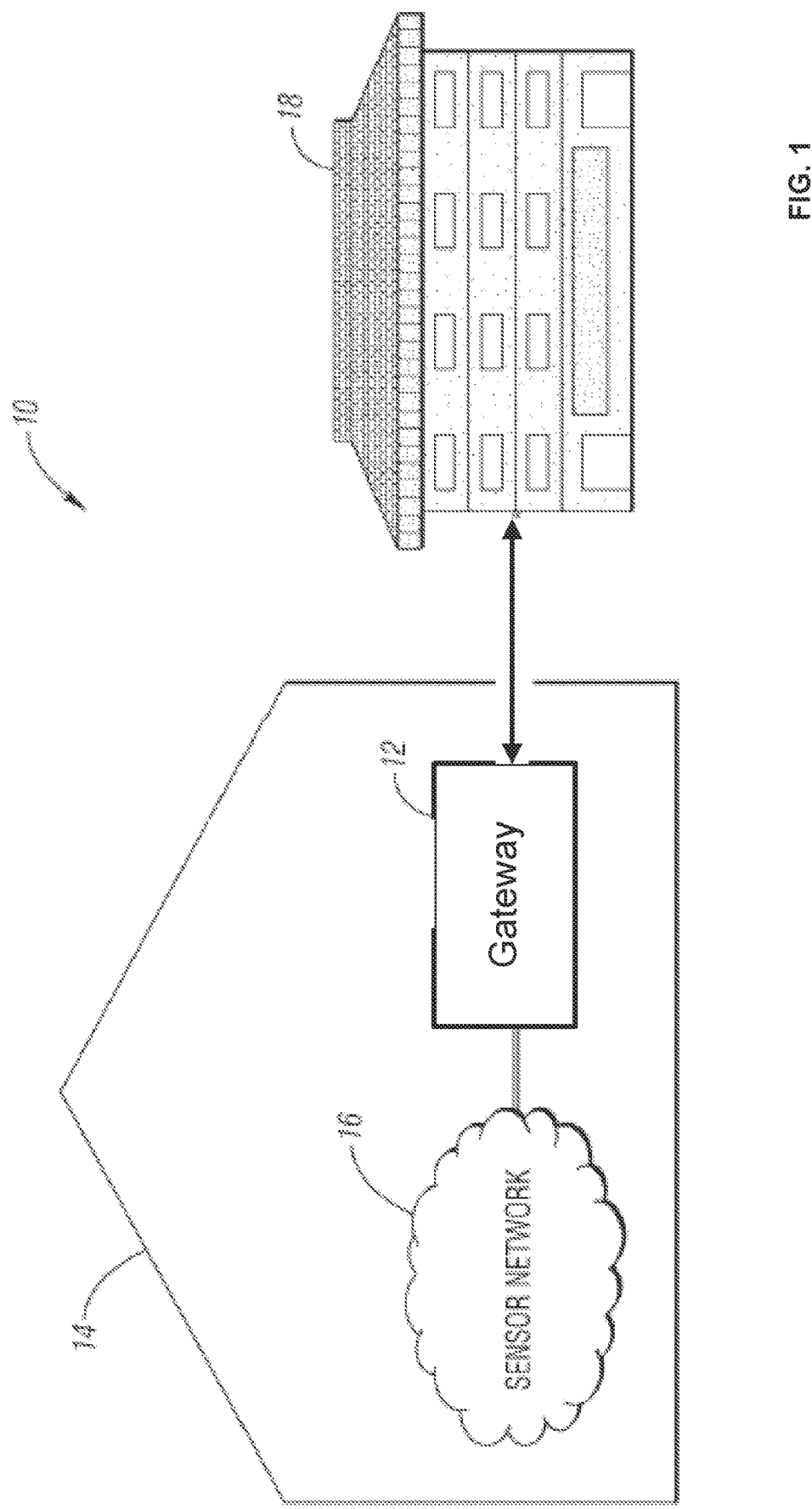
FIG. 1 illustrates am exemplary premises security system.

FIG. 1 illustrates various aspects of an exemplary network in which the present methods and systems may operate. Those skilled in the art will appreciate that present methods may be used in systems that employ both digital and analog equipment. One skilled in the art will appreciate that provided herein is a functional description and that the respective functions may be performed by software, hardware, or a combination of software and hardware.

As illustrated, a premises security system 10 may comprise a gateway 12 disposed at a premises 14. The gateway 12 may be configured to facilitate communications between one or more premises devices 16 and a computing device 18 via a network such as a private or public network (e.g., Internet) using one or more protocols (e.g., Internet protocol). The gateway 12 may be or comprise a computing device that allows one or more other devices in the premises 14 to communicate with the computing device 18 and other devices beyond the computing device 18. The gateway 12 may be or comprise a wireless router/terminal, set-top box (STB), digital video recorder (DVR), computer server, or any other desired computing device. The gateway 12 may also include (not shown) local network interfaces to provide communication signals to other devices in the home (e.g., user devices), such as televisions, STBs, personal computers, laptop computers, wireless devices (wireless laptops and netbooks, mobile phones, mobile televisions, personal digital assistants (PDA), etc.), and any other desired devices. Examples of the local network interfaces may include Multimedia Over Coax Alliance (MoCA) interfaces, Ethernet interfaces, universal serial bus (USB) interfaces, wireless interfaces (e.g., IEEE 802.11), Bluetooth interfaces, and others. The premises device 16 may be an electronic device such as a computer, a smartphone, a laptop, a tablet, a set top box, or other device capable of communicating with the computing device 18. As an example, the premises device 16 may be or comprise a video capture device such as a camera or image sensor. As another example, the premises device 16 may be configured to communicate, directly or via the gateway 12, with the computing device 18 and/or other network devices via a network. As a further example, the premises device 16 may be configured to process captured video into segments of a predetermined time (e.g., clips of 10-20 seconds). The configurations of the premises device 16 may be managed in response to settings and/or other information received from the computing device 18 or other devices. The video segments may be transmitted to the computing device 18 in a periodic fashion, thereby minimizing burden on network resources such as bandwidth. The computing device 18 may process the received video segments and distribute the video segments to the appropriate video store. Once the video clips are stored, one or more playback devices (not shown), such as video client applications, may access or received the video segments for playback.

Figure 2:
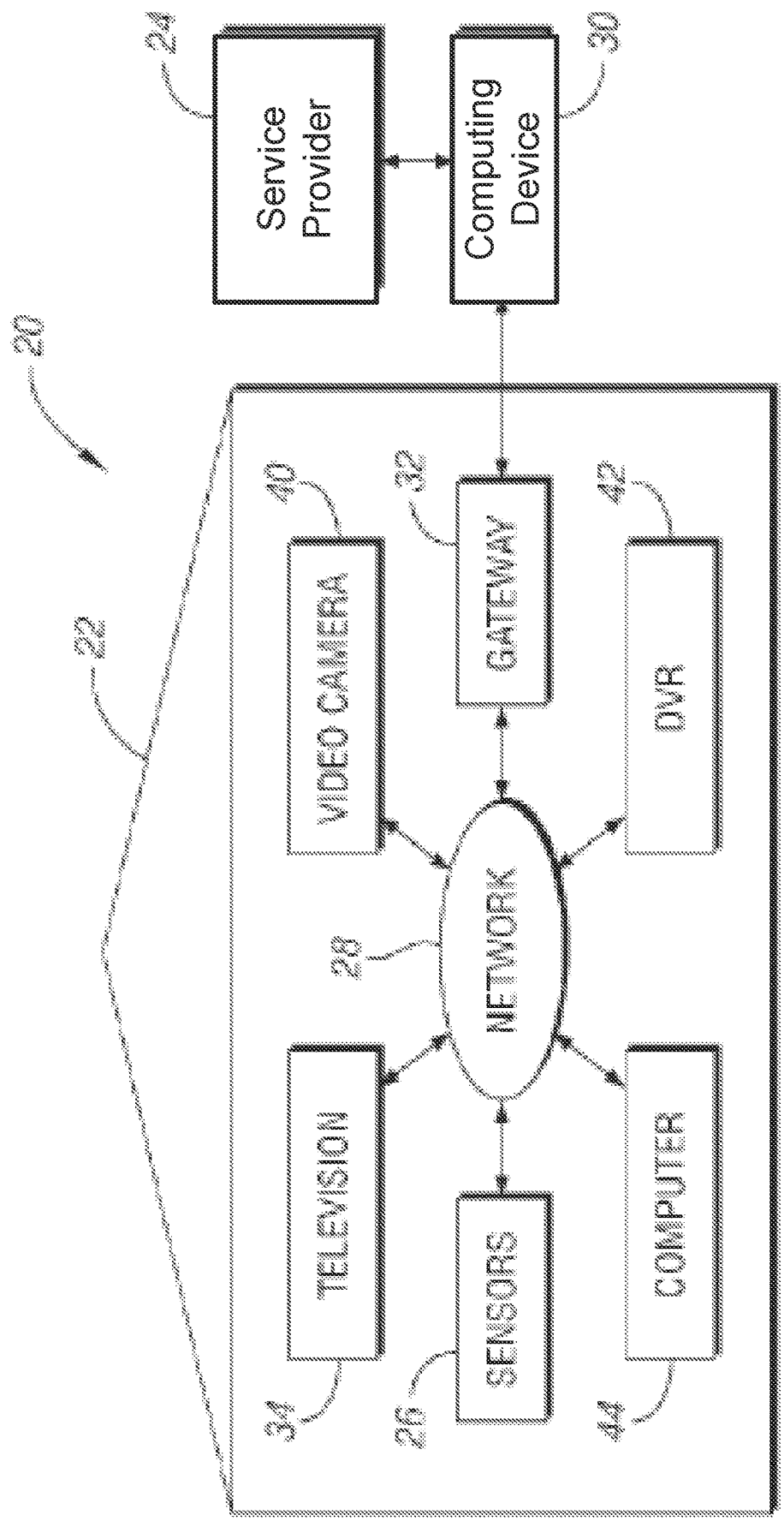
FIG. 2 illustrates an exemplary building security system.

FIG. 2 illustrates a building security system 20 that may be configured to support security-related surveillance and services for a home, office, or other premises 22. A security service provider 24, such as a central monitoring station, may communicate with the premises 22 to support any number of building security processes. The system 20 may support security processes that rely on one or more sensors 26, such as audio, video, temperature, air quality, and presence sensors, to monitor related conditions within the premises 22. The sensors 26 may be examples implementations of the premise device 16 described with regards to FIG. 1. Data regarding the monitored conditions may be communicated over a network 28 to a computing device 30. While FIG. 2 illustrates an aspect of the disclosure in connection with a building, the systems and methods of the present disclosure are not limited to implementation with a building or facility.

The network 28 may be any type of wireless or wireline network such as, but not limited, to a high speed data network used by cable television service providers to support cable television signaling and/or other types of networks used to support high speed data and non-television related signaling. The network may be used to support continuous transmission of data from the sensors 26 regardless of whether the monitored conditions have changed. This stream of data may be transmitted to the computing device 30 for further processing.

The computing device 30 may assess the need to instigate an alarm from the information provided by the sensors 26. A gateway 32, for example a set-top box (STB), cable modem, router, and/or other service provider/supported device within the building may be used to communicate the data collected by the sensors 26 regarding the conditions in the premises 22 to the computing device 30. The gateway 32 may be the same or similar to the gateway 12 described with respect to FIG. 1. The gateway 32 encapsulates or otherwise packages the data provided by the sensors 26 for transmission to the computing device 30 without performing security-related processing.

The security-related processing associated with triggering the alarms is performed by the computing device 30. This alleviates processing demands on the gateway 32. If changes or other updates to the security process are needed, i.e., to support new functionality, home devices, sensors, etc., the computing device 30 may be updated instead of requiring significant updates to the gateway 32.

The computing device 30 may be configured to monitor conditions in a number of premises 22 and to separately instigate alarms in each premises 22. Each premises 22 may similarly transmit sensed conditions to the computing device 30 for processing. Because the computing device 30 is used instead of the gateway 32 to assess the need for the alarm, the computing device 30 is updated to support updated functionality in each of the premises 22 without requiring significant updates in the buildings. This may limit the cost of updates when the service provider 24 provides additional services to customers.

The computing device 30 may include any number of applications that perform any number of security processes, such as, but not limited to, those associated with person monitoring, video monitoring, audio monitoring, medical monitoring, energy management, and/or some combination thereof.

For example, monitoring may include monitoring for movements within the premises 22 and generating an alarm if movements are not determined over a period of time. Video monitoring may use facial recognition or other techniques to assess whether intruders are within the premises 22. For example, a video camera 40 may be included to capture video from within the premises 22, and a DVR 42 may begin recording video when presence detectors sense a presence within a room while the building security system 20 is armed. This video may be transmitted to the computing device 30 for intruder analysis and/or alarm verification. Similarly, audio monitoring may operate with the video monitoring to support related security assessments. The information from any sensor 26 may be used with information from the other sensors 26 to assess the need for an alarm.

Various devices (e.g., sensors 26, video camera 40, DVR 42, etc.) relating to the premises 22, also referred to as premises devices, may be configured to capture and/or process captured information into segments or bundles for periodic transmission. For example, the video camera 40 may be configured to transmit segments of video having a predetermined length of time (e.g., 0-10 seconds, 0-20 seconds, 10-20 seconds, and other ranges having intervening endpoints). The configurations of the devices such as the video camera 40 may be managed in response to settings and/or other information received from the computing device 30 or other devices. The video segments may be transmitted to the computing device 30 in a periodic fashion, thereby minimizing burden on network resources such as bandwidth. The computing device 30 may process the received video segments and distribute the video segments to the appropriate video store. Once the video clips are stored, one or more playback devices (not shown), such as video client applications, may access or received the video segments for playback.

Figure 3A:
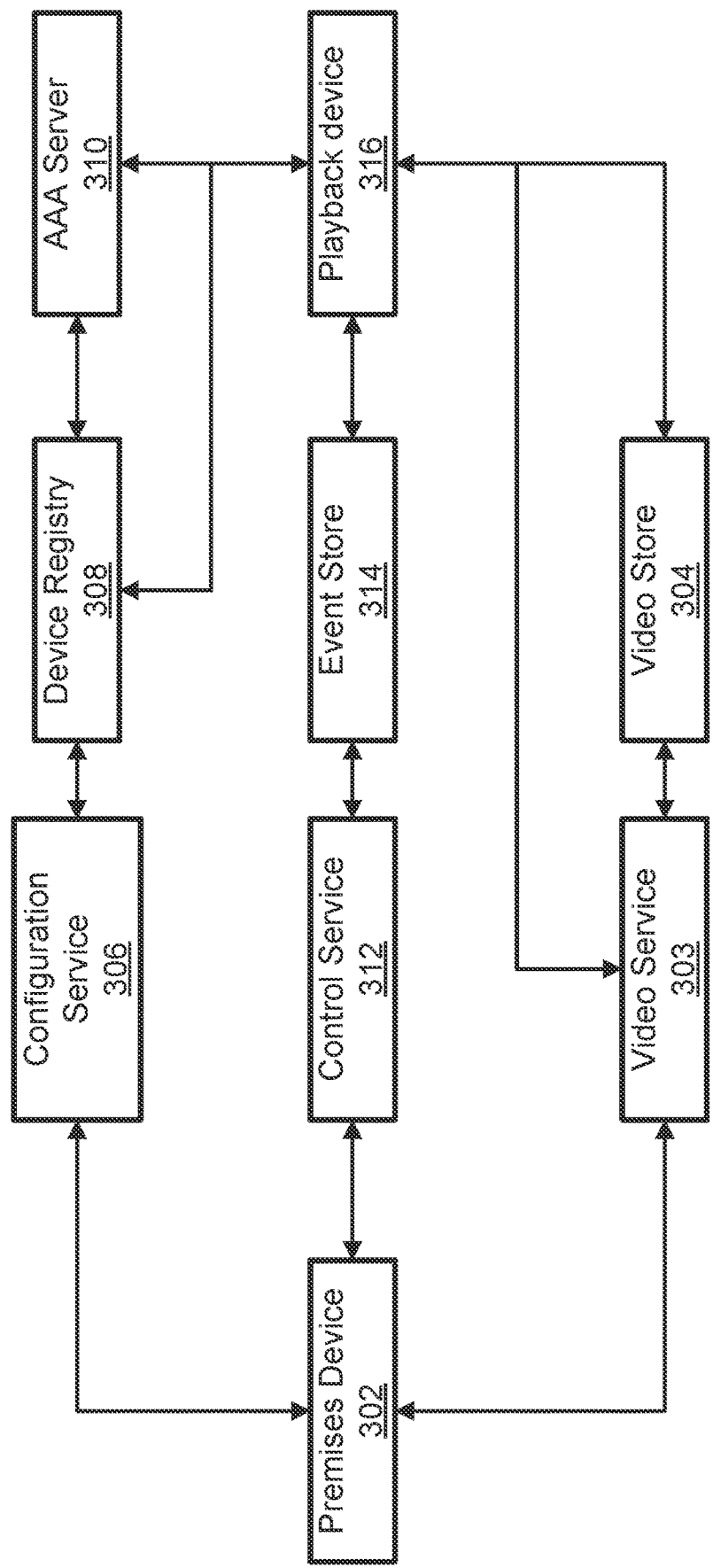
FIG. 3A is a block diagram of an exemplary system and network.
Figure 3B:
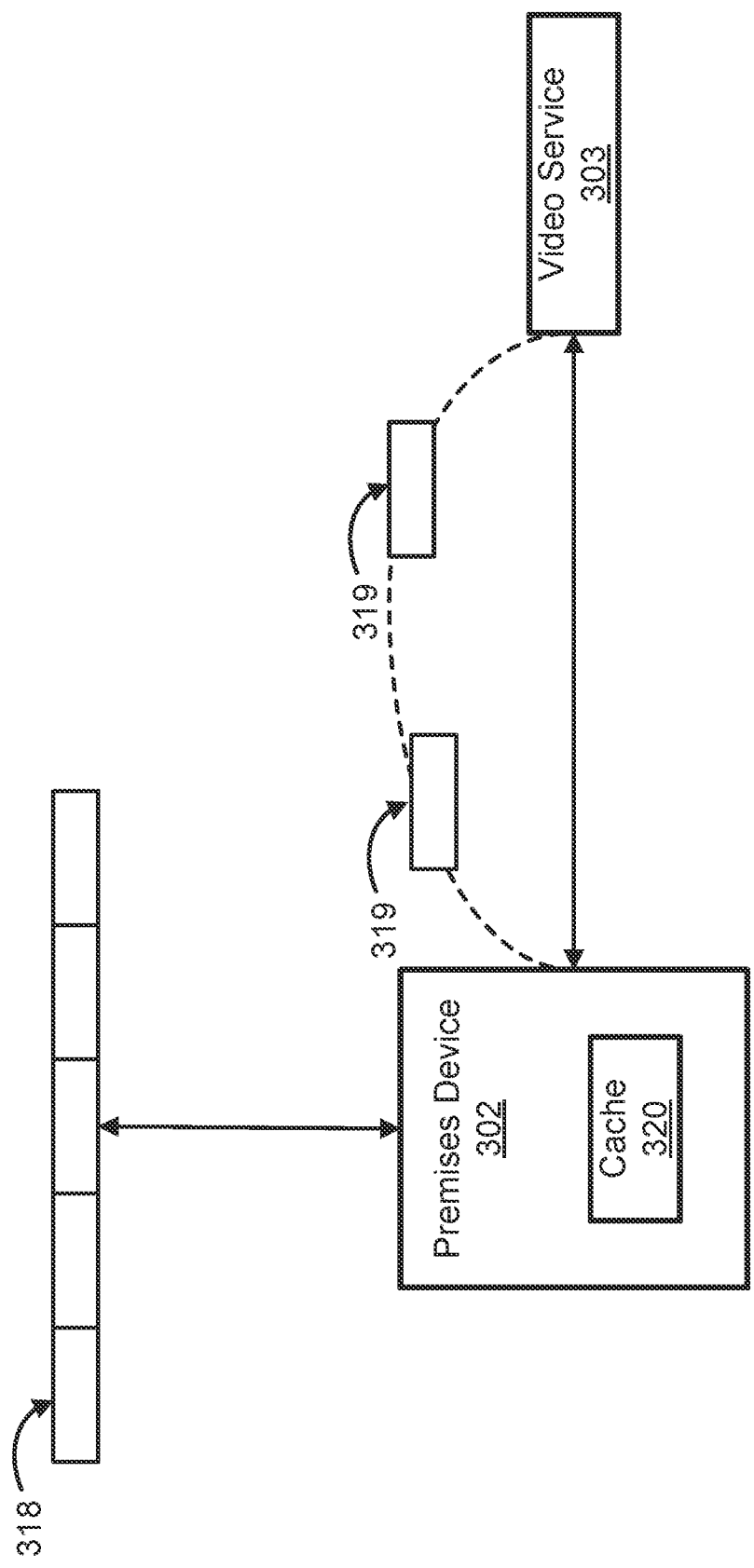
FIG. 3B is a block diagram of an exemplary system and network showing transmission of video segment of a captured video stream.

In one aspect of the disclosure, a system may be configured to provide services such as network-related services. FIGS. 3A-3B illustrate various aspects of an exemplary environment in which the present methods and systems may operate. The present disclosure is relevant to systems and methods for dynamic communication and control of premises devices 302 such as video capture devices (e.g., cameras), sensors, and the like. As an example, a configuration service 306 may be configured to communicate with one or more premises devices 302 at boot up, on a defined interval, and/or persistent connection to enable/disable video recording, define location to post data such as video data, authentication information such as users or devices on the network, determine video format/settings, and configure the length of a video segment/clip. As an example, the premises device 302 such as a camera may be configured via the configuration service 306 to transmit video segments having a predetermined duration (e.g., between about 10 seconds and about 20 seconds) to a video service 303. The video service 303 may process the video segments and distribute the video segments to the appropriate network storage, such as video store 304. The video service 303 may also facilitate the storage of the video segments in multiple locations for geo-redundancy, for example. Once the video segments are stored, one or more playback devices 316, such as video client applications, may access or receive the video segments using a manifest providing storage and identification information for the video segments. This solution removes the need for an additional camera server or hub device in the premises, solves NAT traversal challenges, improves network (e.g., Wi-Fi) performance of other devices in the premises, and does not require modifications to the video format for playback.

The video service 303 may comprise hardware and/or software configured to facilitate the access or receipt of information such as video segments from one or more premises device 302 associated with a premises. As an example, the video service 303 may be configured to communicate with the premises devices 302 via an IP network using standard protocols, as appreciated by one of skill in the art. As a further example, the premises devices 302 may be configured to transmit (e.g., push) information such as a video segments in a period manner. As such, the premises devices 302 may capture video continuously and may cache segments of video having a predetermined length of time. The video segments may be transmitted periodically to the video service 303 for storage external to the premises. As an example, the video service 303 may process the received information and may cause the information to be stored, for example via the video store 304. Various storage mechanisms may be used. For example, the video service 303 may facilitate the storage of video segments in multiple locations for geo-redundancy.

The configuration service 306 may comprise hardware and/or software configured to facilitate configuration of settings relating to the operation of one or more premises devices 302. As an example, the configuration service 306 access or receives a requests from the premise devices 302 associated with a configuration settings and returns the configuration for the particular premise device 302.

The premises device 302 may receive or access configuration information using various protocols, conventions, and specifications. As an example, the premises device 302 may request configuration information using an HTTP GET. Such a request is illustrated below as Table 1:

TABLE 1

> GET /config/1234567890AB
> Host: config-cvr.g.hostaddress.com
> Connection: close
> User-Agent: Sercomm iCamera2-C V3.0.02.35 1234567890AB
> X-Request-Id: 944A0C203683-001-20160225073739
> X-Seq: 55
> Authorization: Basic 0987654321FEDCBA
>
< HTTP/1.1 200 OK
< Content-Type: application/xml
< Request-Time: 22
< Content-Length: 1511

As illustrated in Table 1, the request for configuration information may include an identifier or designation indicating a path (e.g., /config/1234567890AB) associated with the configuration information for the particular premises device 302. The request may include a host identifier such as config-cvr.g.hostaddress.com indicating an address of the service host. The request may include an indication of the connection status (e.g., Connection: close), The request for configuration information may include one or more identifiers relating of the source of the request, such as the premises device 302. The identifiers may include make, model, firmware version, device identifier (e.g., cameraId) such as illustrated in Table 1 as "User-Agent: Sercomm iCamera2-C V3.0.02.35 1234567890AB," where make is Sercomm, model is iCamera2-C, firmware version is V3.0.02.35, and device identifier is 1234567890AB. Other identifiers may also be used, such as a request identifier that may be unique for each request (e.g., X-Request-Id: 944A0C203683-001-20160225073739).

Communications between the premises device 302 and the configuration service, or other services, may be logged. As an example, each attempted request for configuration information may be tracked using a incremental field such as "X-Seq: 55," illustrated in Table 1. As a further example, the attempted request log may be set to zero when the premises device 302 is restarted.

The request for configuration information may include authorization information such as an authorization header (e.g., Authorization: Basic 0987654321FEDCBA), which may be based on the standard or protocol being implemented for the request. The request for configuration information may include additional information such as receipt confirmation (e.g., HTTP/1.1 200 OK), content type (e.g., Content-Type: application/xml), request process time (e.g., Request-Time: 22), response content length (e.g., Content-Length: 1511 (in bytes)), and the like.

The recipient (e.g., configuration service 306) of the request for configuration information may process the request and provide a response. As an example, the response may include configuration information such as device settings and may be transmitted using various protocols, conventions, and specifications. The configuration service 306 may be configured to communicate directly or indirectly (e.g., via a network gateway) with one or more of the premises devices 302 to access settings relating to the premises devices 302 and/or to update the settings for operation of the premises devices 302. The settings may be provided in various data structures and formats, including, and may include parameters such as activation/deactivation, light sensitivity, firmware, storage location, captured video format, and captured video duration.

Settings provided via the configuration service 306 may also include activation of network video storage (e.g., cloud camera recording). As such, network video storage may be a feature that is activated and deactivated for one or more devices such as the premises device 302.

Light sensitivity (e.g., Lux) of the premises device 302 may be adjusted using the configuration information. As an example, by adjusting the day-to-night and night-to-day settings, the sensitivity settings of the premises device 302 may be configured for certain conditions or transitions (e.g., day or night mode). As a further example, switching the premises device 302 from day to night mode may include activating infrared lights or sensors and triggering the infrared cut filter to enable video capture under dark conditions.

One or more services such as the configuration service 306 may manage firmware rollouts and updates including defining a location for accessing certain firmware versions. As an example, the configuration information transmitted to the premises device 302 may include a URL indicating the location of firmware for updating the premises device 302. Firmware Force: By setting this to true or false, Comcast may control the rollout of firmware upgrades to the camera, as well as, dictate the location of the firmware.

The configuration information may include information relating to the capture and storage of video. The configuration information may include parameters associated with audio, group of pictures (GOP) formatting, frames per second, resolution, and bit rates of video captured via the premises device or other device.

The configuration information may include a path (e.g., URL) indicating the destination that the premises device 302 should post video segments. The path may be associated with a network storage such as the video store 304 or may be a path associated with the video service 303 for managing to storage of the video segments. The configuration information may also include a segment format and segment duration (e.g., size). Segment formats may include MPEG2-TS or mp4 and other video formats now known or later developed. The configuration information may include a time parameter indicating a duration of video segments that may be incrementally captured and transmitted. As an example, the time parameter may indicate a 20 second time duration, where the premises device 302 may be configured to capture video in real-time, but transmit the captured video in blocks of 20 second duration. As such, the capture of video is not interrupted, but the burden on the network caused by continuous streaming is minimized due to the periodic (e.g., non-continuous) transmission of the 20 second video segments. Other time parameters may be used such as aa time parameter between above 0 seconds and 60 seconds.

Alternatively, or additionally, the configuration information may include a transmission frequency parameter indicating the frequency by which the video segments are transmitted to network storage (e.g., the video store 304) or the video service 303 for management of storage and subsequent access. Continuing the example from above, one or more 20 second video segments may be cached (e.g., stored locally to the premise device 302) and transmitted to the video service 303 and/or video store 304 on a period basis. If the configuration information includes a transmission frequency parameter indicating 60 seconds, then, every 60 seconds a batch of one or more 20 second video segments may be transmitted to the video service 303 and/or network storage (e.g., video store 304). Various frequencies may be used including once per day, every hour, every minute, every twenty seconds, etc. By updating the configuration information, the video segment duration and the frequency of transmission may be modified dynamically. Accordingly, bandwidth may be conserved on the network without forsaking the real-time and continuous capture of video.

With particular reference to FIG. 3B, the premises device 302 may be caused to activate and capture a video stream 318 of at least a portion of a premises. As described above, the premises device 302 may store the captured video stream 318 as video segments 319 having a fixed duration. As an example, the premises device 302 may store the video segments 319 in a local storage such as a cache 320. Although the video stream 318 may be captured in a continuous manner, the premises device 302 may be configured to transmit the video segments 319 in a non-continuous manner, such as a periodically. One or more of the duration of the video segments 319 and the frequency by which the video segments 319 are transmitted may be provided for by the configuration service 306. As such, one or more video segments 319 may be transmitted as a pre-defined interval to the video service 303 and/or a network storage such as the video store 304. The video segments 319 may then be accessed by various users and/or devices over a network having access to the video service 303 and/or the video store 304.

The configuration service 306 may be in communication with a device registry 308 to determine the number and identification of the premises devices 302 associated with a particular premises and/or user (e.g., customer). The device registry 308 may include user identifiers or premises identifiers and may associate device information with the user or premises identifiers. For example, device information may include a make, a model, a firmware version, and/or a device identifier for each premises device 302 associated with a particular user or premises. As a further example, the configuration service 306, or other services, may access the device registry to retrieve information relating to a premises and to ensure that the appropriate devices are being configured. As devices are added to a premises or taken away from a premises, the device registry 308 may be updated.

The configuration service 306 may be in communication with an authentication, authorization, and accounting (AAA) server 310 or similar device to manage entitlements, security, and account management relating to a particular security system, premises, and/or user. The AAA server 310 may be in communication with the device registry 308 to manage access and entitlements to the premise devices 302 on a device-by-device basis. For example, a user may request access to video segments captured by a particular premise device 302 at a particular premises. As such, the AAA server 310 may be accessed to authenticate a user or device associated with the user and to facilitate selective access to the premises device 302 based on entitlements stored on the AAA server.

A control service 312 may comprise hardware and/or software configured to facilitate the dynamic operation of one or more of the premises device 302. The control service 312 may control the activation of one or more of the premises devices 302 to capture video of at least a portion of the premises. The control service 312 may cause one or more of the premises devices 302 to capture video in response to event rules such as motion detection, time schedules, sensor alarms, and the like. For example, event detection may include monitoring for movements within the premises and generating an alarm if certain movements are determined or not determined over a period of time. As a further example, the control service 312 may use facial recognition or other techniques to assess whether intruders are within the premises and may cause the premises devices 302 to activate in response to an intrusion event. Other event rules and control of the premises devices 302 may be implemented. Heuristic models and historical information may be relied upon to determine event rules. In certain aspects, the functions of the control service 312 and the configuration service 306 may be provided by a single service via distinct logical components. In other aspects, the control service 312 and the configuration service 306 may relate to a unified logical element or implementation. Other physical and logical implementations may be used.

Various events may be tracked and an event log may be stored locally to the premises device 302 or remotely. The control service 312 may a destination path or address for the storage of event alerts. The control service 312 may implement a quiet interval, where the premise device 302 does not alert based on detected events. The sensitivity of event detection may be modified, for example, via hardware or software settings using the configuration service 306 and/or the control service 312. Additionally, or alternatively, sensitivity may be based on defined rules provided by the configuration service 306 and/or the control service 312 to govern the manner by which the premises device 302 detects and/or alerts a particular event. For example, motion detection may be detected based on a certain speed or magnitude of movement. As a further example, the alerting of such a detection may be triggered on a second threshold of increased magnitude. Various rules and thresholds may be used to manage the detection and alerting of the detection.

The control service 312 may be in communication with an event store to store information (e.g., event log manifest) relating to detected events. As an example, when an event is detected and video of the premises is captured, the control service 312 may store information relating to identification of a video segment and time markers (e.g., event manifest) relevant to the detected event. Such storage may be via any storage medium such as an event store 314. Subsequently, the video segments relating to the detected event may be retrieved based upon the identification of the video segment and time markers, as stored via the event store 314. In certain aspects, the event markers may be linked in a databases to a storage location associated with one or more video segments associated with the detected event. As such, a request for a particular event marker may be linked to the video segment or segments associated with the underlying event.

One or more of the playback device 316 may be configured to access or receive information (e.g., a manifest) relating to the identification of video segments, storage location, and/or event information. Such information may be stored as one or more manifests providing information relating to the location of certain video segments, for example as a universal resource locator (URL). The playback devices 316 may use the manifest to request the video segments using the associated information. As an example, once authenticated, the playback device 316 may request certain video segments based on the information in the manifest. The playback device 316 may request particular video segments based on a time marker associated with a wall time that the video segments were captured. For example, the playback device 316 may transmit a request for the video segments associated with an interval of time such as between 9:00 am and 11:00 am on a particular date. The playback device 316 may request video segments based on an event marker. For example, the playback device 316 may transmit a request for video segments associated with an alarm occurring at a particular time. As such, the video segment associated with the request from the playback device 316 may be transmitted to the playback device 316 for playback.

As an illustrative example, one or more of the configuration service 302 and the control service 312 may be used to manage the settings for the capture and storage of video relating to a premises, such as a monitored premise. The premises device 302 may be configured to selectively capture video of the premises in response to certain events such as an alarm, an intrusion detection, a motion detection, or a scheduled time, or a combination thereof. Once activated, the premises device 302 may capture live (e.g., real-time) video of at least a portion of the premises. However, instead of streaming the captured video in a continuous transmission, the premises device 302 may be configured to cache portions or segments of the captured video having a predefined duration (e.g., between 1 and 60 seconds, between 1 and 30 seconds, etc.). The time duration of the segments of video and the frequency of the transmission of the segments may be dynamically updated for particular users, premises devices 302, time intervals, service plans, and the like. A user may then request playback of video of the premises. As an example, the user may request video for a particular period of time or relating to a particular event using the playback device 316. Since the real-time video was captured and stored on a network device (e.g., video store 304), the user may access the stored video from any device or location that has access to the video store 304. Although the video was cached and transmitted as segments, the playback of the segmented video may be presented in a seamless manner to provide a continuous playback stream for the user.

Figure 4:
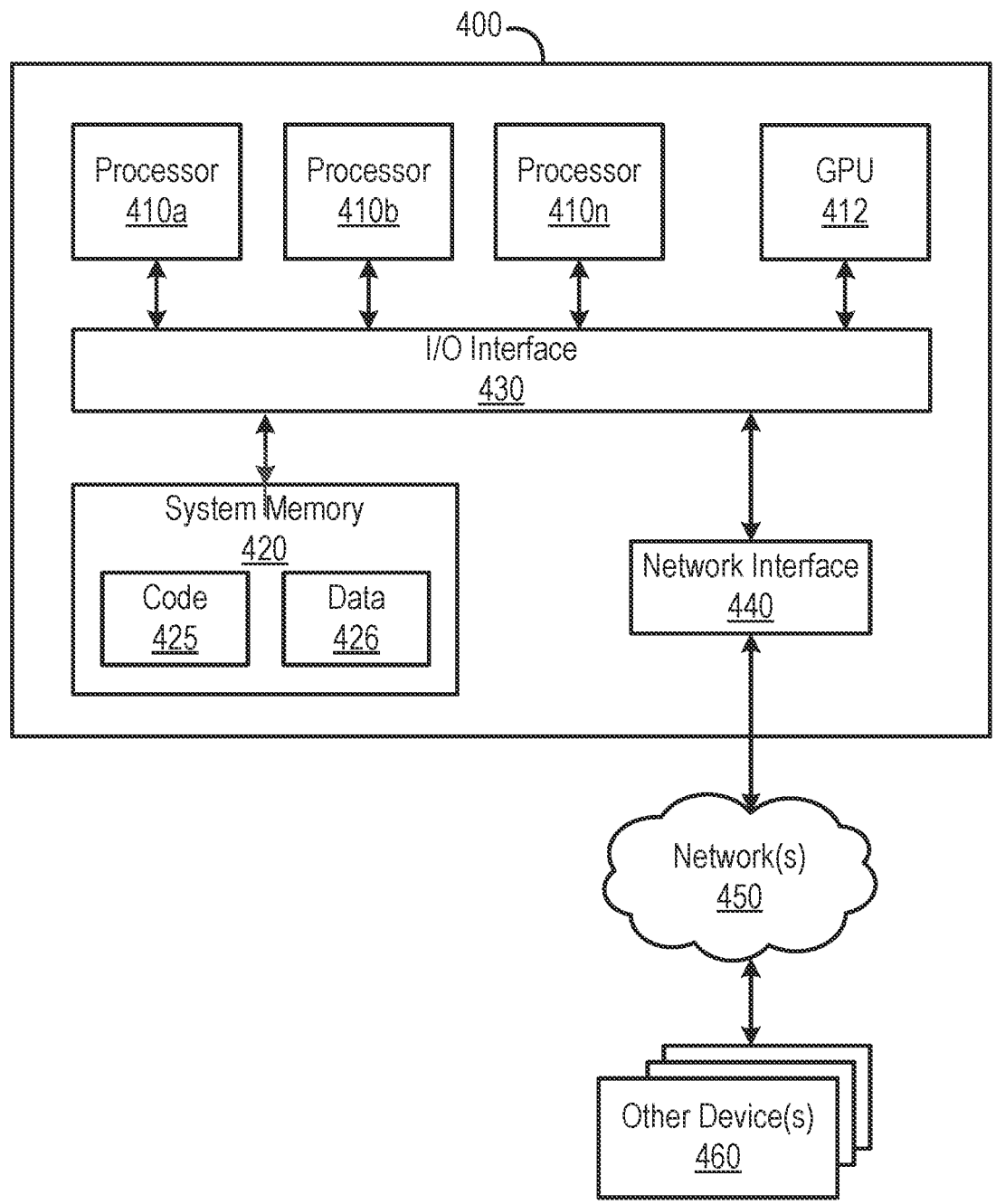
FIG. 4 is a block diagram of an exemplary system and network.

The methods and systems may be implemented on a computing system, such as computing device 30 as illustrated in FIG. 2 and/or the devices and service described in relation to FIG. 3A, for example. Similarly, the methods and systems disclosed may utilize one or more computers to perform one or more functions in one or more locations. FIG. 4 depicts a general-purpose computer system that includes or is configured to access one or more computer-accessible media. In the illustrated aspect, a computing device 400 may include one or more processors 410*a*, 410*b*, and/or 410*n* (which may be referred herein singularly as the processor 410 or in the plural as the processors 410) coupled to a system memory 420 via an input/output (I/O) interface 430. The computing device 400 may further include a network interface 440 coupled to an I/O interface 430.

In various aspects, the computing device 400 may be a uniprocessor system including one processor 410 or a multiprocessor system including several processors 410 (e.g., two, four, eight, or another suitable number). The processors 410 may be any suitable processors capable of executing instructions. For example, in various aspects, the processor(s) 410 may be general-purpose or embedded processors implementing any of a variety of instruction set architectures (ISAs), such as the x86, PowerPC, SPARC, or MIPS ISAs, or any other suitable ISA. In multiprocessor systems, each of the processors 410 may commonly, but not necessarily, implement the same ISA.

In some aspects, a graphics processing unit ("GPU") 412 may participate in providing graphics rendering and/or physics processing capabilities. A GPU can, for example, include a highly parallelized processor architecture specialized for graphical computations. In some aspects, the processors 410 and the GPU 412 may be implemented as one or more of the same type of device.

The system memory 420 may be configured to store instructions and data accessible by the processor(s) 410. In various aspects, the system memory 420 may be implemented using any suitable memory technology, such as static random access memory ("SRAM"), synchronous dynamic RAM ("SDRAM"), nonvolatile/Flash®-type memory, or any other type of memory. In the illustrated aspect, program instructions and data implementing one or more desired functions, such as those methods, techniques and data described above, are shown stored within the system memory 420 as code 425 and data 426.

In one aspect, the I/O interface 430 may be configured to coordinate I/O traffic between the processor(s) 410, the system memory 420 and any peripherals in the device, including a network interface 440 or other peripheral interfaces. In some aspects, the I/O interface 430 may perform any necessary protocol, timing or other data transformations to convert data signals from one component (e.g., the system memory 420) into a format suitable for use by another component (e.g., the processor 410). In some aspects, the I/O interface 430 may include support for devices attached through various types of peripheral buses, such as a variant of the Peripheral Component Interconnect (PCI) bus standard or the Universal Serial Bus (USB) standard, for example. In some aspects, the function of the I/O interface 430 may be split into two or more separate components, such as a north bridge and a south bridge, for example. Also, in some aspects some or all of the functionality of the I/O interface 430, such as an interface to the system memory 420, may be incorporated directly into the processor 410.

The network interface 440 may be configured to allow data to be exchanged between the computing device 400 and other device or devices 460 attached to a network or networks 450, such as other computer systems or devices, for example. In various aspects, the network interface 440 may support communication via any suitable wired or wireless general data networks, such as types of Ethernet networks, for example. Additionally, the network interface 440 may support communication via telecommunications/telephony networks, such as analog voice networks or digital fiber communications networks, via storage area networks, such as Fibre Channel SANs (storage area networks), or via any other suitable type of network and/or protocol.

In some aspects, the system memory 420 may be one aspect of a computer-accessible medium configured to store program instructions and data as described above for implementing aspects of the corresponding methods and apparatus. However, in other aspects, program instructions and/or data may be received, sent, or stored upon different types of computer-accessible media. Generally speaking, a computer-accessible medium may include non-transitory storage media or memory media, such as magnetic or optical media, e.g., disk or DVD/CD coupled to computing device the 400 via the I/O interface 430. A non-transitory computer-accessible storage medium may also include any volatile or non-volatile media, such as RAM (e.g., SDRAM, DDR SDRAM, RDRAM, SRAM, etc.), ROM, etc., that may be included in some aspects of the computing device 400 as the system memory 420 or another type of memory. Further, a computer-accessible medium may include transmission media or signals, such as electrical, electromagnetic or digital signals, conveyed via a communication medium, such as a network and/or a wireless link, such as those that may be implemented via the network interface 240. Portions or all of multiple computing devices, such as those illustrated in FIG. 4, may be used to implement the described functionality in various aspects; for example, software components running on a variety of different devices and servers may collaborate to provide the functionality. In some aspects, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

Figure 5:
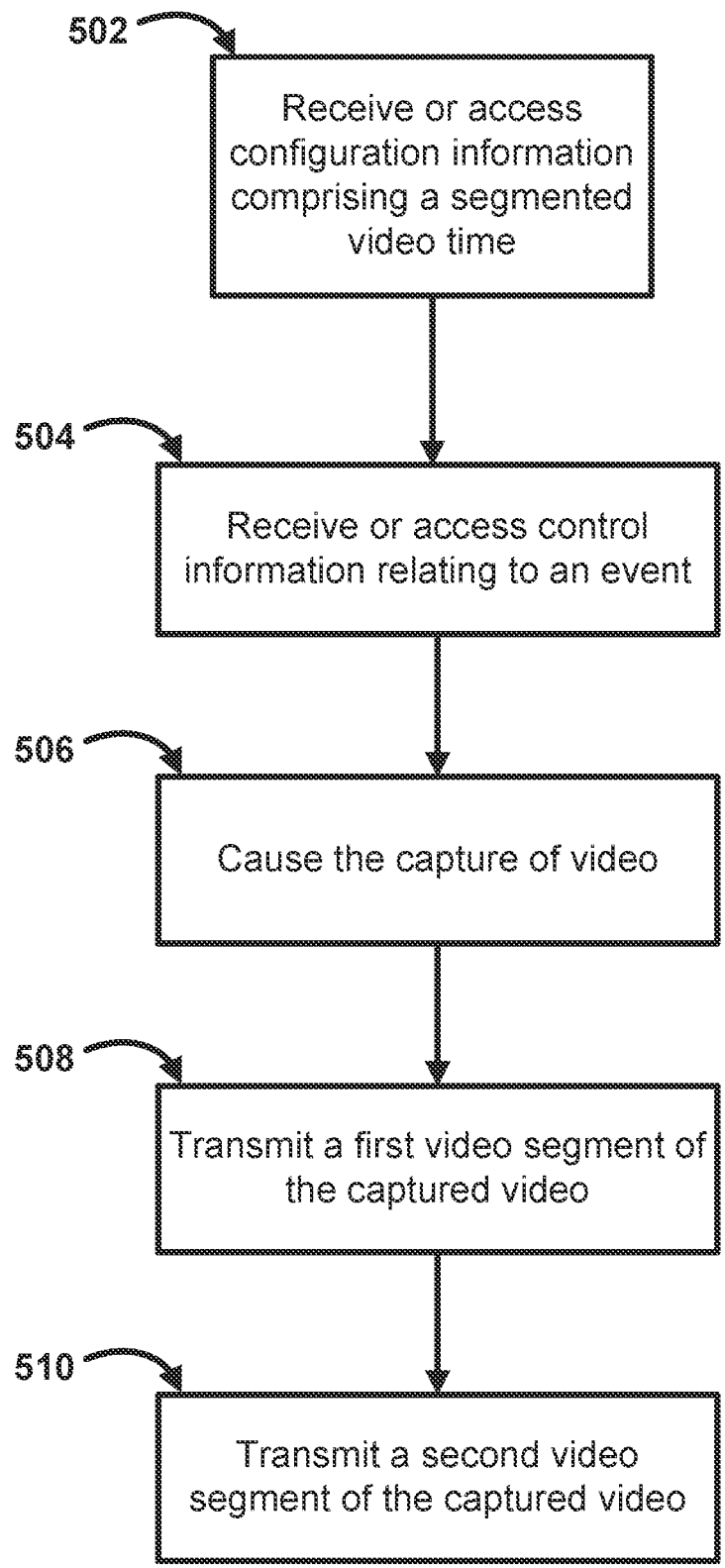
FIG. 5 is a flow chart of an exemplary method.

An exemplary method is shown in FIG. 5. In step 502, configuration information may be received or accessed, for example by the premises device 302 (FIG. 3A). The configuration information may comprise a segmented video time (e.g., 0-30 seconds, 0-20 seconds, 10-20 seconds, etc.). The segmented video time may be configured at any time duration and may be dependent on device memory and processing capacity. The configuration information may comprise other settings such as activation of network video storage capability (e.g., cloud camera recording), video transmission frequency, and the like.

In step 504, control information may be received or accessed, for example by the premises device 302 (FIG. 3A). As an example, the control information may control the activation of one or more of the premises devices 302 to capture video of at least a portion of the premises. As another example, the control information may cause one or more of the premises devices 302 to capture video in response to event rules such as motion detection, time schedules, sensor alarms, and the like. For example, event detection may include monitoring for movements within the premises and generating an alarm if certain movements are determined or not determined over a period of time.

In step 506, one or more devices such as the premises devices 302 (FIG. 3A) may be caused to capture video. As an example, the captured video may relate to at least a portion of a premises such as surveillance video. As another example, the devices may be caused to capture video based at least on the control information received or accessed in step 504, which may be based on capture rules and event-based video capture.

In step 508, a first video segment of the captured video may be caused to transmit, for example, to a network video service and/or video store. As a further example, the first video segment has a length of time that is based at least on the segmented video time of the configuration information, as received in step 502. Such a transmission may be periodic and may be based at least on the configuration information. For example, the configuration information may be transmitted to one or more devices to manage a frequency of video segment transmission by controlling at least a time duration of segmented video clips.

In step 510, transmitting a second video segment of the captured video, wherein the second video segment has a length of time that is based at least on the segmented video time of the configuration information, as received in step 502. Such a transmission may be periodic and may be based at least on the configuration information. For example, the configuration information may be transmitted to one or more devices to manage a frequency of video segment transmission by controlling at least a time duration of segmented video clips. As such, the second segment of video is transmitted in a non-continuous manner relative to the first segment of video. Such a non-continuous transmission may manage available bandwidth of a network as compared to a continuous streaming of captured video over the network. Other transmission mechanism and protocols may be used.

Figure 6:
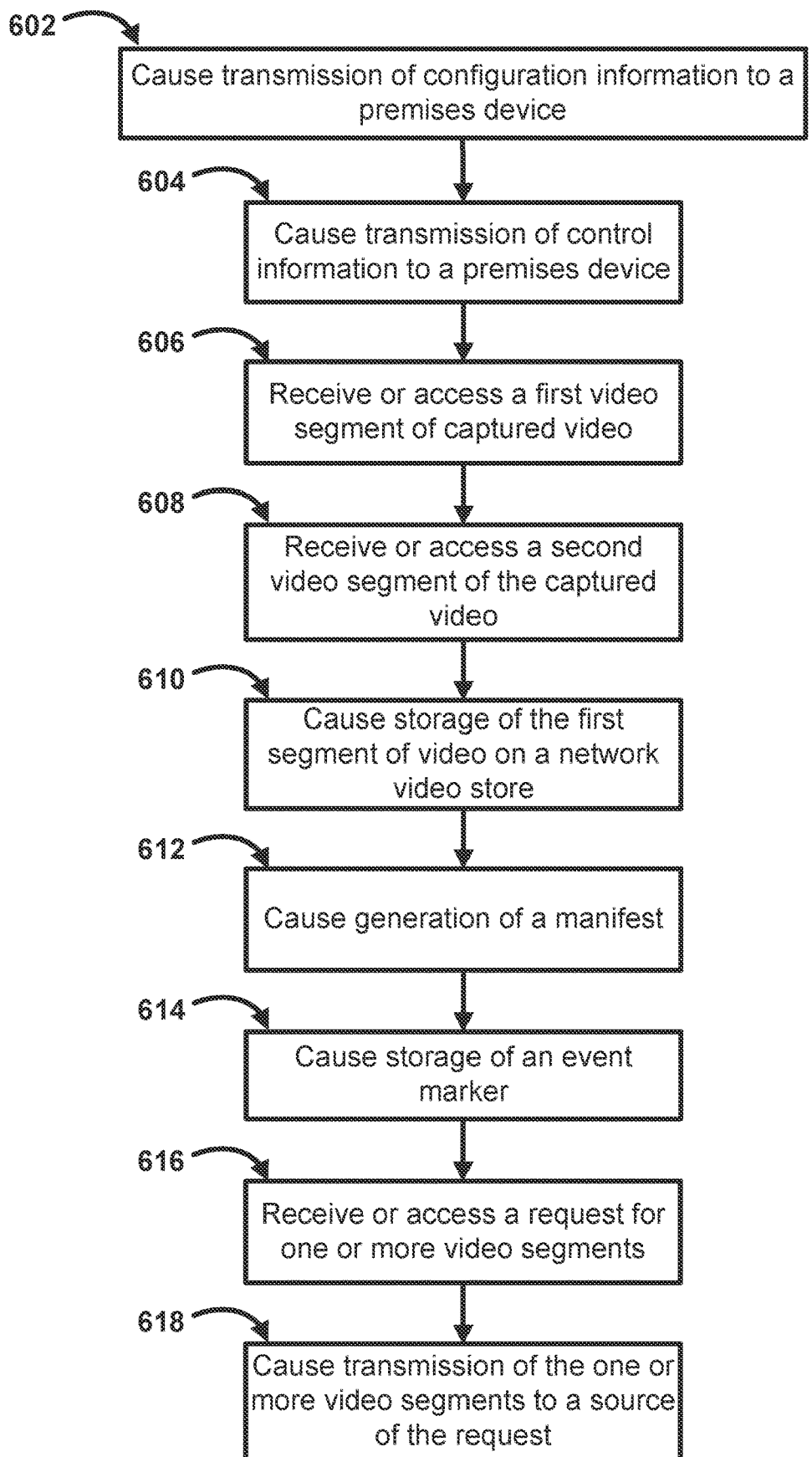
FIG. 6 is a flow chart of an exemplary method.

An exemplary method is shown in FIG. 6. In step 602, configuration information may be caused to transmit to a recipient device such as the premises device 302 (FIG. 3A). The configuration information may comprise a segmented video time (e.g., 0-30 seconds, 0-20 seconds, 10-20 seconds, etc.). The segmented video time may be configured at any time duration and may be dependent on device memory and processing capacity. The configuration information may comprise other settings such as activation of network video storage capability (e.g., cloud camera recording), video transmission frequency, and the like.

In step 604, control information may be caused to transmit to a recipient device such as the premises device 302 (FIG. 3A). As an example, the control information may control the activation of one or more of the premises devices 302 to capture video of at least a portion of the premises. As another example, the control information may cause one or more of the premises devices 302 to capture video in response to event rules such as motion detection, time schedules, sensor alarms, and the like. For example, event detection may include monitoring for movements within the premises and generating an alarm if certain movements are determined or not determined over a period of time.

In step 606, a first video segment of a captured video may be received or accessed, for example, via a computing device or service such as the video service 303 (FIG. 3A). As a further example, the first video segment has a length of time that is based at least on the segmented video time of the configuration information. Such a reception or access may be periodic and may be based at least on the configuration information. For example, the configuration information may be transmitted to one or more devices to manage a frequency of video segment transmission by controlling at least a time duration of segmented video clips.

In step 608, a second video segment of a captured video may be received or accessed, for example, via a computing device or service such as the video service 303 (FIG. 3). As a further example, the second video segment has a length of time that is based at least on the segmented video time of the configuration information. Such a reception or access may be periodic and may be based at least on the configuration information. For example, the configuration information may be transmitted to one or more devices to manage a frequency of video segment transmission by controlling at least a time duration of segmented video clips. As a further example, the second segment of video may be received in a non-continuous manner relative to the first segment of video. Such a non-continuous transmission may manage available bandwidth of a network as compared to a continuous streaming of captured video over the network. Other transmission mechanism and protocols may be used.

In step 610, one or more of the first segment of video and the second segment of video may be stored on a network video store such as a video store 304 (FIG. 3A). In step 612, a manifest may be generated relating to one or more of the video segments. As an example, the manifest may comprise information relating to the identification of the first segment of video and a storage location of the first segment of video. In step 614, an event marker may be stored relating to a detect event or event rule. For example, the event marker may relate to a time within the one or more segments of video when an event occurred. As such, the event marker may be used to locate the portion of video relevant to the detected event.

In step 616, a request for one or more video segments may be received or accessed. As an example, the generated manifest may be used by one or more playback devices to request or access the stored video segments. In response to the request, the one or more video segments may be transmitted to a source of the request, at step 618, to facilitate playback of the one or more video segments, for example. The event markers may also be transmitted to the playback device to enable discrete playback of certain portions of the video segments identified by the event markers.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that may be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that may be performed it is understood that each of these additional steps may be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, may be implemented by special purpose hardware-based computer systems that perform the specified functions or steps, or combinations of special purpose hardware and computer instructions.

It will be apparent to those skilled in the art that various modifications and variations may be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

The invention claimed is:

1. A method comprising:
   receiving, by a device associated with a premises, first information associated with a first frequency of transmission of video segments, wherein each video segment has a time duration associated with a presentation time of the video;
   causing capture of video of at least a portion of the premises;
   sending, based on the first frequency of transmission, a first plurality of consecutive video segments;
   receiving, by the device, second information associated with a second frequency of transmission of video segments, wherein the first frequency of transmission and the second frequency of transmission are different; and
   sending, based on the second frequency of transmission, a second plurality of consecutive video segments.

2. The method of claim 1, further comprising receiving control information associated with an event,
   wherein causing capture of the video of at least the portion of the premises comprises causing capture of the video of at least the portion of the premises based on the event.

3. The method of claim 2, wherein the event comprises at least one of an alarm, an intrusion detection, a motion detection, or a scheduled time.

4. The method of claim 1, further comprising receiving information associated with the time duration,
   wherein each video segment of the first plurality of consecutive video segments and each video segment of the second plurality of consecutive video segments have a duration equal to the time duration.

5. The method of claim 1, wherein the sending the first plurality of video segments and the sending the second plurality of video segments are further based on the time duration of each video segment.

6. A video capture device comprising:
   one or more processors; and
   memory storing instructions that, when executed by the one or more processors, cause the video capture device to:
   receive, by a device associated with a premises, first information associated with a first frequency of transmission of video segments, wherein each video segment has a time duration associated with a presentation time of the video;
   cause capture of video of at least a portion of the premises;
   send, based on the first frequency of transmission, a first plurality of consecutive video segments;
   receive, by the device, second information associated with a second frequency of transmission of video segments, wherein the first frequency of transmission and the second frequency of transmission are different; and
   send, based on the second frequency of transmission, a second plurality of consecutive video segments.

7. The video capture device of claim 6, wherein the instructions cause the video capture device to capture live video of at least the portion of the premises.

8. The video capture device of claim 6, wherein the instructions further cause the video capture device to receive control information associated with an event, and the instructions cause the video capture device to capture the video of at least the portion of the premises based on the event.

9. The video capture device of claim 8, wherein the event comprises at least one of an alarm, an intrusion detection, a motion detection, or a scheduled time.

10. The video capture device of claim 6, wherein the instructions further cause the video capture device to receive information associated with the time duration, wherein each video segment of the first plurality of consecutive video segments and each video segment of the second plurality of consecutive video segments have a duration equal to the time duration.

11. A system comprising:
    a video capture device configured to capture video of at least a portion of a premises; and
    a computing device configured to:
    send, to the video capture device, first information associated with a first frequency of transmission of video segments, wherein each video segment has a time duration associated with a presentation time of the video;
    receive, based on the first frequency of transmission, a first plurality of consecutive video segments;
    send, to the video capture device, second information associated with a second frequency of transmission of video segments, wherein the first frequency of transmission and the second frequency of transmission are different; and
    receive, based on the second frequency of transmission, a second plurality of consecutive video segments.

12. The system of claim 11, wherein the computing device is further configured to send control information associated with an event, and wherein the video capture device is configured to capture the video of at least the portion of the premises based on the event.

13. The system of claim 11, wherein the computing device is further configured to:
    determine available network bandwidth;
    determine the first information associated with the first frequency of transmission of video segments based on the available network bandwidth;
    determine the available network bandwidth has changed; and
    determine the second information associated with the second frequency of transmission of video segments based on the changed available network bandwidth.

14. The system of claim 11, wherein the computing device is further configured to cause storage of an event marker indicative of a time of the event.

15. The system of claim 14, wherein the event comprises at least one of an alarm, an intrusion detection, a motion detection, or a scheduled time.

16. The system of claim 11, wherein the computing device is further configured to send information associated with the time duration, and wherein each video segment of the first plurality of consecutive video segments and each video segment of the second plurality of consecutive video segments have a duration equal to the time duration.

17. The system of claim 11, wherein the computing device is further configured to:
- cause storage of the video; and
- cause generation of a manifest identifying the video and a storage location of the video.

18. The system of claim 11, wherein the computing device is further configured to:
- receive, from a source, a request for the video; and
- cause transmission of the video to the source.

19. The system of claim 18, wherein the source is different from the video capture device and the computing device.

\* \* \* \* \*